United States Patent [19]

Hungerford

[11] 4,388,258
[45] Jun. 14, 1983

[54] POLYMER FILM COATED WITH AQUEOUS POLYMER

[75] Inventor: Gordon P. Hungerford, Palmyra, N.Y.

[73] Assignee: Mobil Oil Corporation, New York, N.Y.

[21] Appl. No.: 235,887

[22] Filed: Feb. 19, 1981

[51] Int. Cl.³ .................................................. B29D 7/24
[52] U.S. Cl. .................................... 264/129; 264/182; 264/210.7; 264/216; 427/173
[58] Field of Search ............. 427/173; 264/182, 210.3, 264/210.7, 129, 216; 428/910

[56] References Cited

U.S. PATENT DOCUMENTS

| | | | |
|---|---|---|---|
| 3,262,808 | 7/1966 | Crooks et al. | 427/40 |
| 3,271,178 | 9/1966 | Nadeau et al. | 430/535 |
| 3,506,751 | 4/1970 | Lurie | 264/134 |
| 3,988,157 | 10/1976 | van Paesschen et al. | 430/335 |
| 4,197,356 | 4/1980 | Arbit | 428/520 |

Primary Examiner—Evan K. Lawrence
Attorney, Agent, or Firm—Charles A. Huggett; James F. Powers, Jr.; James P. O'Sullivan, Sr.

[57] ABSTRACT

A system for producing coated, oriented polymer film. Methods and apparatus are provided for forming a continuous film of the polymer with water uniformly dispersed therein and applying an aqueous coating composition to at least one surface of the film. The film is oriented and dried under constraint to remove water from the substrate film and coating.

8 Claims, 3 Drawing Figures

POLYMER FILM COATED WITH AQUEOUS POLYMER

BACKGROUND OF THE INVENTION

This invention relates to coating of water-containing plastic sheet and production of oriented polymer film therefrom. In particular, it relates to methods for applying aqueous polymer coating compositions to water-containing substrates during film manufacture.

A variety of polymers are suitable for making films or foil products coated with water-dispersible, film-forming resins, such as vinylidene chloride polymers (saran-type), epoxy resins and the like. Film products are often manufactured by casting or extruding a continuous web, tubular shape or other sheet-like material, which is subsequently stretched to provide molecular orientation and treated to remove volatile components. Often such films require an additional layer of a different polymer to achieve the desired sealing or bonding properties, gas barrier characteristics, etc. Conventional systems often apply another coating to the film substrate as an aqueous dispersion.

Various films, such as polyolefins, polyesters, polyamides, acrylics or many others are treated by coating with various resin coatings. Acrylonitrile polymers and other resinous materials may be treated with saran dispersions to obtain the desired product.

In U.S. Pat. No. 4,197,356 a cast oriented polyacrylonitrile (PAN) is treated with an aqueous emulsion containing saran polymer. The film can be manufactured by solvent casting with subsequent removal of the solvent. After orientation and drying, the PAN film is treated with an aqueous vinylidene chloride copolymer dispersion and redried to obtain a coated finished product. Saran-type coatings are applied to a variety of substrate materials in U.S. Pat. Nos. 3,262,808, 3,271,178, 3,506,751 and 3,988,157, as subbing layers, heat sealing promoters, barrier layers and photographic film support, for instance.

Prior art film manufacturing techniques usually treat the formation, orientation and coating treatment of films as separate and distinct production steps, often requiring multiple handling and drying, frequently requiring special procedures to assure adequate bonding between the coating and substrate. It is an object of the invention to provide a simplified method for coating water containing sheets with an aqueous dispersion of polymeric coating material.

SUMMARY OF THE INVENTION

This invention provides a method for treating water-containing orientable film with an aqueous coating composition prior to complete drying, advantageously applying the coating between orientation and/or drying equipment sections of a continuous film manufacturing line. In one embodiment methods are provided for producing biaxially-oriented polymer film comprising the sequential steps of (1) forming a continuous water-containing film having a self-supporting hydrophilic polymer matrix with water uniformly dispersed therein; (2) heating and stretching the film longitudinally to orient the polymer uniaxially; (3) applying an aqueous polymeric coating to at least one surface of the aquagel film; (4) transversely stretching the coated film to provide a biaxially-oriented polymer substrate; and (5) drying the coated, oriented polymer film under constraint to remove water. This method is especially useful where the polymer consists essentially of acrylonitrile interpolymer or homopolymer in aquagel form essentially free of volatile organic matter, and the aqueous coating comprises a dispersion of thermally-bondable saran-type copolymer containing a major amount of vinylidene chloride.

One of the objects of this invention is to provide a method for applying an aqueous polymeric coating to a wetted substrate as a liquid vehicle under circumstances which permit good adhesion of the coating composition. By employing a wet substrate, drying operations are simplified and handling steps are minimized. Advantageously, the longitudinally stretched aquagel film is passed through tentering means wherein the aqueous coating is applied to a center portion of the film immediately before transverse stretching.

DESCRIPTION OF PREFERRED EMBODIMENTS

Film feedstock to be fed to the orientation/coating system can be derived from continuous film casting or extruding equipment. Flat film may be solvent cast according to the process of U.S. Pat. No. 4,066,731, wherein acrylonitrile homopolymer or interpolymer is cast onto a rotating drum from a sheeting die and coagulated as a self-supporting flim. Organic solvent, such as dimethyl sulfoxide, can be washed with a water bath to obtain an aquagel film typically containing 40 to 60% water, integrally bound in the molecular interstices or dispersed in the orientable polymeric matrix. A tubular PAN film can be extruded and water-coagulated if desired, according to the teachings of U.S. Pat. No. 4,144,299 and the unoriented film can be slit and fed to the orientation/coating units as a flat strip. Aqueous PAN film can also be made by melt-extrusion of a high temperature polymer hydrate in a known manner.

The preferred film feedstock is a hydrophilic polymeric material containing sufficient water to be stretched at low temperatures. Acrylonitrile polymers containing at least 5% $H_2O$, preferably aquagels containing about 40 to 60% $H_2O$, are excellent film substrates for use herein. The present system is especially valuable for treating non-thermoplastic PAN homopolymer, such as duPont Type A resin.

Figure 1:
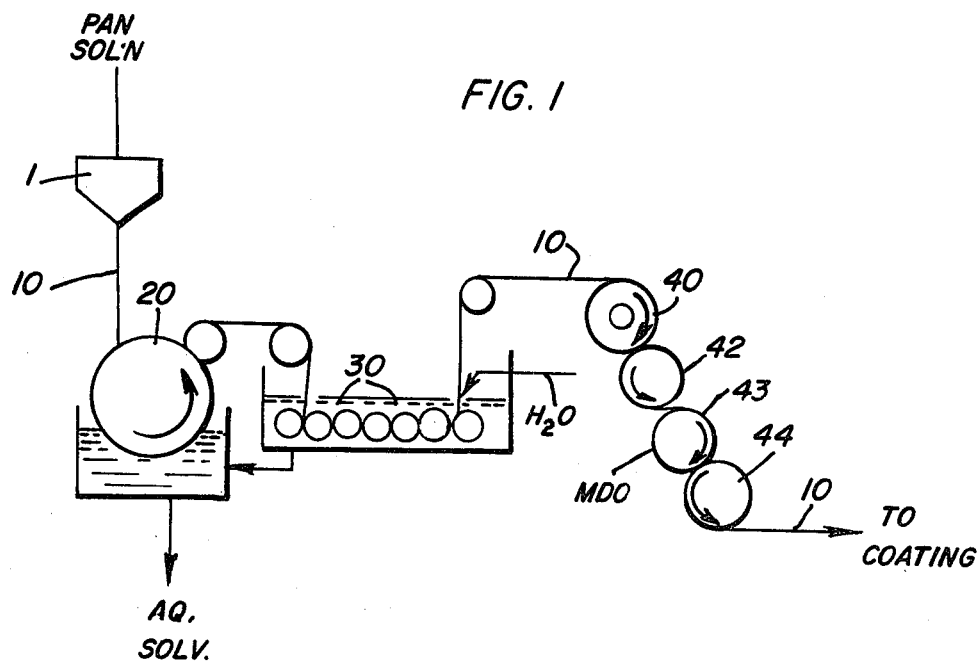
FIG. 1 is a schematic representation in sideview of a system for producing aquagel film.

Referring to FIG. 1, a continuous flow system for manufacturing aquagel film is shown. For instance, hot polyacrylonitrile-dimethylsulfoxide solution is fed under pressure to sheeting die 1, which extrudes a thin film of polymer solution onto cold drum surface 20. After contacting an aqueous medium, the self-supporting aquagel film is stripped from drum 20 and traverses a countercurrent aqueous bath 30, wherein the organic solvent is removed and replaced by water, thereby forming the aquagel. The film 10 passes through the machine direction orienter (MDO) 40 comprising a first heated roll maintained at about 75° C. and thereafter a series of orienting rolls 42, 43, 44 which are maintained at a sufficient differential speed to longitudinally stretch the web about 2× to 3× thereby providing a uniaxially oriented aquagel film. The faster rolls are kept at about 50° C. Thereafter the film is transferred to the coating and subsequent treatment sections shown in FIG. 2.

Figure 2:
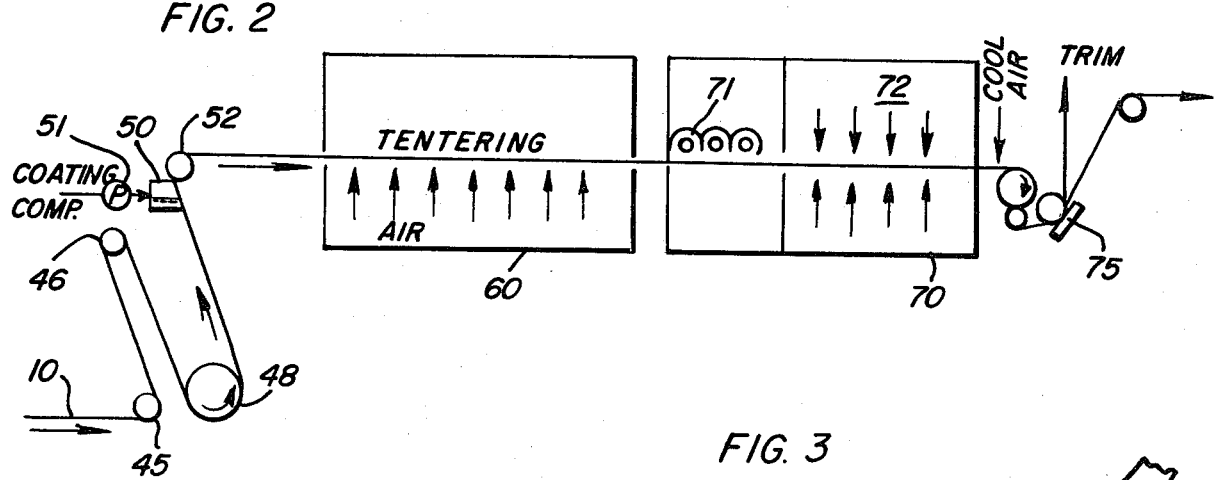
FIG. 2 is a schematic sideview of a system for coating, orienting and drying film according to the present invention.

Referring to FIG. 2, the uniaxially oriented aquagel film 10 is passed over a series of rolls 45, 46, 48 which provide adequate tension to control the coating operation and to guide the film laterally. Dancer idler 45 and web guide 48 provide the appropriate tension and position for the film prior to coating in unit 50 wherein a liquid coating composition is metered through pump 51 to a trough coating unit 50 maintained in contact with film strip 10. The position is maintained by roller guide 52 which contacts only the underside of film 10 which has a wet top coating applied to a center band.

The device 50 for coating flat film on a continuous line shown in FIG. 2 is a trough-type film coater having means for holding film strip 10 taut against the open-sided applicator into which a steady stream of liquid coating composition is fed at metered rate corresponding to the take up rate of the liquid onto the film surface. This coating unit is particularly useful for applying a low viscosity aqueous liquid, such as saran dispersion. Upward movement of the flat film provides adequate pick-up as it passes across the open side of the coating unit. The film is held against the open side, thereby forming an upwardly moving fluid barrier, with the film providing an effective fluid seal at the bottom and side edges of the coater face. The aqueous coating composition is metered at a predetermined rate which is coordinated with linear film speed. There are several advantages to the trough coater unit, e.g., the amount of aqueous coating composition can be varied widely without cracking or cratering of the film during drying. With a thickened 55% aqueous saran dispersion, 60 microns or more (dry basis) can be applied. Using the same coating conditions, but with a relatively thinner 25% saran concentration, only about 8 microns (dry basis) is deposited. This system is efficient in that it places a wide band of uniformly deposited coating on the film strip, leaving the edges uncoated. The trough coater unit is space efficient and can be incorporated into existing orientation lines before the tentering or drying apparatus to provide closely-coupled coating, tentering and/or drying operations. While it is preferred to place the coating step before the tentering step, this sequence can be reversed, if desired. Design considerations should take into account the change in coating thickness during orientation, wherein the film may be stretched several times its original linear dimension, reducing the coating thickness.

The coating composition can be applied by calendering, spraying, roll-coating, meniscus contact or a variety of other well-known techniques. A gravure coater, reverse-roll coater or air knife coater may be used effectively for some applications. While the coating is usually required on one side only, double-sided coatings are feasible.

Because most orientation equipment is designed to provide longitudinal stretching in the machine direction (MD) to provide uniaxial orientation by differential speed rolls, the initial orientation step does not increase film width. Thereafter the film can be coated, transversely oriented and dried without contacting the film with mechanical handling equipment except at the edges. Since the film width is increased substantially by the lateral stretching operation, coating equipment size can be kept small by installing the coater between MD and TD orienting equipment. It may be advantageous to house the coater integrally with the tentering unit, preferably connected operatively to receive the uniaxially oriented film from the MDO unit.

As the coated film progresses from the coating section, as shown in FIG. 2, it passes through a transverse direction orientation (TDO) unit 60. The transverse direction orientation (TDO) step is usually effected by attaching edge clips to the film progressively and stretching the film perpendicular to its machine direction travel. The edge portions are much thicker than the main body of the film and are ordinarily trimmed from the finished product. In the TDO unit the film may be contacted with moist hot gas to prevent excessive water loss. Means for impinging hot water-saturated air or the like at high velocity can be provided in a standard tentering apparatus; such as manufactured by Marshall and Williams Co. or as disclosed in U.S. Pat. No. 3,611,479. TD stretch ratios of 2:1 to 4:1 or higher may be employed, with 3:1 being employed for typical PAN aquagel film.

The biaxially-oriented film is dried under constraint to remove water and other volative materials which may be present in the film, either residual organic solvent or monomer from the film casting operation or volatile components of the coating composition.

As the film passes through the drier unit 70, it receives energy from a bank of radiant heaters 71 and thereafter is completely dried in oven section 72, where hot air at about 200° C. is directed toward the film at high velocity. Thereafter the film is reduced to handling temperature by a stream of cool air at the exit end of drier 70 and trimmed by slitting blades 75 to remove the edge portions. The coated, biaxially-oriented film may then be wound onto a spool for storage or further processed by addition steps or taken directly to a fabrication line.

Figure 3:
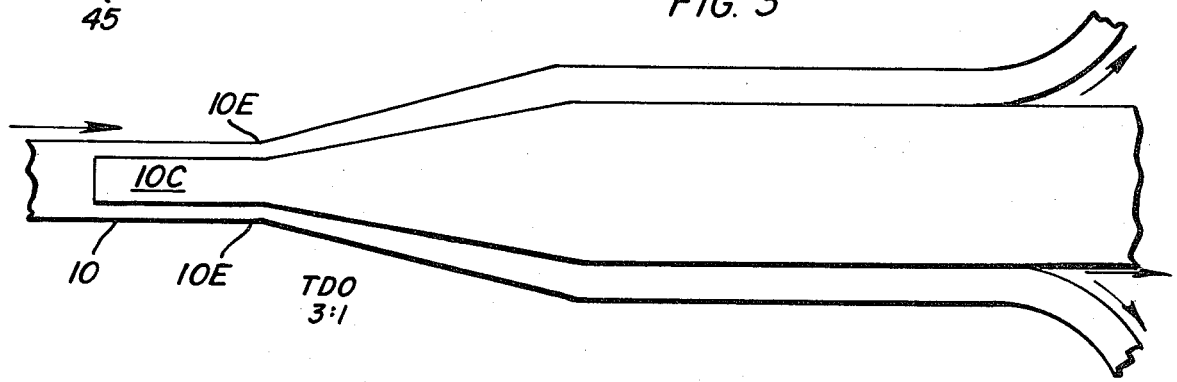
FIG. 3 is a plan view of film made according to the present invention.

In FIG. 3 film 10 is shown in plan view as it progresses through the coating, TDO and finishing operations. The uniaxially oriented strip 10 from the MDO unit receives a coating in a center band portion 10C, leaving edge portions 10E uncoated. Progressive transverse stretching, for example at 3:1, orients the base film and distributes the coating composition as a thin layer. The film is held in this configuration by appropriate tensioning means while the water is removed. Since the film is dried under restrained conditions, no significant shrinkage of the oriented film can occur prior to cooling the dry product.

In the following description and examples, metric units and parts by weight are employed unless otherwise stated.

EXAMPLE 1

Polyacrylonitrile homopolymer aquagel film is made according to U.S. Pat. No. 4,066,731. The sheet weighs about 140 mg/in to 250 mg/in$^2$ (38 mg/cm$^2$) and contains 45–50% water. It is longitudinally stretched 2× on a machine direction orienter with a first heated roll (75° C.) and cooler speed differential rolls (50° C.). The uniaxially oriented wet film enters the coating apparatus at a linear speed of about 9 meters/minute. The film is coated uniformly on its topside with a vinylidene chloride-vinyl acetate copolymer (Dow saran latex SL-112 containing about 55% solids), sufficient to yield a final dry coating thickness of 40–50 microns. The film then enters the TDO tentering apparatus for lateral stretching (3×). The tentering atmosphere is maintained at about 75° C. and high moisture content (90-100% RH) by steam injection. As the film is stretched, the coating becomes hazy, but becomes water clear upon drying. A radiant heater bank followed by convection oven at 205° C. dries the coating and film substrate simultaneously during a 12 second oven residence time. The uncoated edges are trimmed and the products wound onto a spool for storage.

The saran-coated film was heat sealed to itself on the coated side and tested for bond strength, with good results. A 40 micron coating (1.7 mil) produced a seal having strength of greater than 700 grams/inch before film failure, with a sealing temperature of at least 160° C. giving satisfactory seals in 4 to 6 seconds. By reinforcing the PAN substrate with pressure sensitive tape, seal strength of greater than 2500 gm/in is obtainable.

The saran coating was tested for tensile strength alone after delamination and had a yield strength of 6600 psi. Adhesion of the cured coating to dry PAN film can be improved by exposing the finished dry film to ultraviolet radiation, which passes through the U-V transparent PAN material to the coating interface.

Standard water vapor transmission rate (WVTR) for the saran-coated PAN was 0.03 gms/100 in$^2$/day, and standard oxygen transmission rate was 0.04 cc/100 in$^2$/day.

EXAMPLE 2

Uncoated PAN film and the coated film of Ex. 1 were laminated to low density polyethylene sheet (38 microns), and tested for water vapor transmission. Pouches were made from each film, filled with water, sealed and placed in a dry room for one month at about 50° C. and 10% RH for conditioning. The conditioned samples were weighed periodically to measure weight loss. The uncoated PAN WVTR was 0.35 gm/day vs 0.16 gm/day for the saran-coated film. At the end of the test the laminations were observed to be intact and the films showed no adverse effects from the test conditions. The polyethylene layer also improves flex crack resistance, especially when bonded to the PAN side.

In addition to the SL-112 polymer dispersion, other saran-type materials such as "Diophan 1850" or Dow XD 30315.11, may be employed with similar results.

While the preferred coating composition comprises vinylidene chloride copolymers, the technique is useful for applying a variety of aqueous polymeric coating compositions, including solution polymers and/or dispersions of acrylic, epoxy, styrene, melamine, modified cellulose, or halogenated olefinic resins. Latices of elastomeric polymers, such as butadiene copolymer rubber materials, wax dispersions, etc. are useful as coatings for various substrates. Polycarboxylic resins made with ethylenically unsaturated monomers, carboxymethyl cellulose, or polyvinylalcohols comprise a class of water-soluble resins which may be applied advantageously. Melamine-formaldehyde ("Accobond") prepolymers and, amide resins may also be coatings, etc.

Application rate or coating thickness may vary considerably depending upon the use. Where a saran-type coating is required only for heat sealing purposes a coating weight of 1 to 10 grams/m$^2$ is adequate. However, much thicker coatings may be desired for certain purposes. In some cases 50 to 75 microns or more (dry basis after stretching) may be applied in a single pass of polyacrylonitrile aquagel film with a thick concentrated saran dispersion. Where the coating step is followed by further stretching, the final thickness may be considerably smaller than applied prior to orientation and drying.

The dry, coated, biaxially oriented film may be employed as transparent wrap for food or other packaged materials requiring a barrier film. Low oxygen and water vapor permeability are obtained. The laminates are heat sealable, strong and tear-resistant. A relatively high modulus of elastically and elongation at the break during tensile testing provides good wrap film properties.

It is understood that more than one coating layer can be applied, and that mixed resins, dyes, pigments, fillers, and other additives may be incorporated into the coating composition and/or polymeric film without departing from the inventive concept.

The saran-coated polyacrylonitrile products may be heat-laminated to other preformed films, such as polyolefins (e.g., propylene-ethylene copolymer) to obtain laminates which are useful in manufacturing containers, retortable pouches for food storage and the like.

I claim:

1. A method for producing biaxially-oriented acrylonitrile polymer film comprising the sequential steps of
   forming a continuous aquagel film having a self-supporting acrylonitrile polymeric matrix with water uniformly dispersed therein;
   heating and stretching said aquagel film longitudinally to orient the polymer uniaxially;
   applying an aqueous coating of vinylidene chloride polymer to at least one surface of said aquagel film;
   transversely stretching the coated aquagel film to provide biaxially-oriented polymer; and
   drying the coated, oriented polymer film under constraint to remove water from the coating and film concurrently.

2. The method of claim 1 wherein said polymer consists essentially of acrylonitrile homopolymer, essentially free of volatile organic matter, and wherein said aqueous coating comprises a dispersion of thermally bondable polymer containing at least 80 weight percent vinylidene chloride.

3. The method of claim 1 wherein the longitudinal stretching step is carried out by contacting the aquagel film with at least one heated roll mounted for rotation in the direction of continuous film travel, said film being stretched by differential speed rolls.

4. The method of claim 3 wherein the longitudinally stretched aquagel film is passed through coating means wherein the aqueous coating is applied immediately before transverse stretching by tentering means.

5. The method of claim 4 wherein the aquagel film is passed horizontally through the tentering means and wherein the aqueous coating is applied to the bottom surface of said aquagel film.

6. The method of claim 5 wherein the biaxially oriented film is dried in a multi-zone drier by directing radiant heat toward the top surface of the aquagel film, and by contacting the film with a current of hot dry gas.

7. The method of claim 2 wherein the polymer dispersion comprises a viscous material consisting essentially of about 25 to 60 weight percent interpolymer containing a major amount of vinylidene chloride, wherein the polymer dispersion is continuously applied to the aquagel film by contacting an upwardly moving flat film strip with an open side of a trough coater and wherein the polymer dispersion is metered to the trough coater at predetermined rate coordinated with the linear speed of the moving film strip.

8. A method for preparing coated polymer film comprising:

forming a continuous self-supporting film of a polymer with water uniformly dispersed therein;

heating and stretching said film longitudinally to orient it uniaxially;

applying an aqueous coating composition to at least one surface of the water-containing film;

transversely stretching the coated water-containing film to biaxially orient the film; and drying the coated, biaxially oriented film while under constraint to remove water from the film and coating simultaneously.

* * * * *